(12) United States Patent
Sawai (10) Patent No.: US 11,313,513 B2
(45) Date of Patent: Apr. 26, 2022

(54) PRESSURE VESSEL AND MANUFACTURING METHOD THEREOF (71) Applicant: Toyota Jidosha Kabushiki Kaisha, Toyota (JP)

(72) Inventor: Osamu Sawai, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 417 days.

(21) Appl. No.: 16/424,967

(22) Filed: May 29, 2019

(65) Prior Publication Data

US 2020/0049312 A1 Feb. 13, 2020

(30) Foreign Application Priority Data

Aug. 9, 2018 (JP) .............................. JP2018-150690

(51) Int. Cl.
*F17C 1/02* (2006.01)
(52) U.S. Cl.
CPC ........ *F17C 1/02* (2013.01); *F17C 2201/0109* (2013.01); *F17C 2203/012* (2013.01); *F17C 2203/067* (2013.01); *F17C 2203/0621* (2013.01); *F17C 2209/2154* (2013.01); *F17C 2221/012* (2013.01); *F17C 2270/0184* (2013.01)
(58) Field of Classification Search
CPC ............... F17C 1/02; F17C 2201/0109; F17C 2203/012; F17C 2203/0621; F17C 2203/067; F17C 2209/2154; F17C 2221/012; F17C 2270/0184

USPC .......................................................... 220/589
See application file for complete search history.

(56) References Cited

U.S. PATENT DOCUMENTS

| 4,778,073 A | * | 10/1988 | Ehs | ...................... | B29C 53/602 |
| | | | | | 220/590 |
| 5,822,838 A | * | 10/1998 | Seal | .................. | B23K 15/0046 |
| | | | | | 29/469.5 |
| 2005/0076995 A1 | | 4/2005 | Yasui | | |
| 2006/0096993 A1 | * | 5/2006 | Takashima | ................ | F17C 1/06 |
| | | | | | 220/588 |

(Continued)

FOREIGN PATENT DOCUMENTS

| CA | 3011556 A1 | 8/2017 |
| DE | 202016100754 U1 | 2/2016 |

(Continued)

*Primary Examiner* — J. Gregory Pickett
*Assistant Examiner* — Niki M Eloshway
(74) *Attorney, Agent, or Firm* — Dinsmore & Shohl LLP (57) ABSTRACT

A pressure vessel includes: a vessel main body having a cylindrical straight body part, and domed parts respectively including hemispherical portions that have hemispherical shapes and are integrally formed at each end of the straight body part; a first reinforced section formed by winding reinforcing fibers around an outer circumferential surface of one domed part such that the reinforcing fibers are interlaced with each other; a second reinforced section formed by winding the reinforcing fibers helically around an outer circumferential surface of the straight body part, continuously from the first reinforced section; and a third reinforced section formed by winding the reinforcing fibers around an outer circumferential surface of the other domed part such that the reinforcing fibers are interlaced with each other, continuously from the second reinforced section.

11 Claims, 9 Drawing Sheets

(56) References Cited

U.S. PATENT DOCUMENTS

| | | | |
|---|---|---|---|
| 2009/0314785 A1 | 12/2009 | Cronin et al. | |
| 2012/0048862 A1 | 3/2012 | Otsuka et al. | |
| 2013/0087567 A1* | 4/2013 | Kaneko | F17C 1/06 220/590 |
| 2013/0092311 A1* | 4/2013 | Kobayashi | B29C 70/326 156/64 |
| 2017/0219165 A1 | 8/2017 | Takemoto | |
| 2018/0104916 A1 | 4/2018 | Nishiwaki et al. | |
| 2018/0281271 A1* | 10/2018 | Sugawara | F17C 1/02 |
| 2019/0077109 A1* | 3/2019 | Takemoto | B32B 5/147 |
| 2019/0086029 A1 | 3/2019 | Wada et al. | |
| 2019/0285227 A1* | 9/2019 | Veenstra | F17C 1/02 |
| 2020/0158287 A1* | 5/2020 | Ueda | F17C 1/06 |
| 2021/0247025 A1* | 8/2021 | Nouwen | F17C 1/06 |
| 2021/0262616 A1* | 8/2021 | Kamiya | D03D 15/44 |

FOREIGN PATENT DOCUMENTS

| | | |
|---|---|---|
| EP | 2418414 B1 | 1/2015 |
| JP | 2004-263827 A | 9/2004 |
| JP | 2005-308055 A | 11/2005 |
| JP | 2017-155836 A | 9/2017 |
| WO | 2016020972 A1 | 2/2016 |
| WO | 2016/074952 A1 | 5/2016 |
| WO | 2017073108 A1 | 5/2017 |

\* cited by examiner

PRESSURE VESSEL AND MANUFACTURING METHOD THEREOF

CROSS-REFERENCE TO RELATED APPLICATIONS

This application claims priority to Japanese Patent Application No. 2018-150690 filed on Aug. 9, 2018, which is incorporated herein by reference in its entirety including the specification, drawings and abstract.

BACKGROUND

1. Technical Field

The present disclosure relates to a pressure vessel and a manufacturing method thereof.

2. Description of Related Art

In the field of pressure vessels having a metal vessel main body composed of a straight body part and substantially hemispherical domed parts respectively closing both ends of the straight body part, with reinforcing fibers helically wound around the vessel main body to form a fiber-reinforced-plastic layer, a structure has been hitherto known in which a fabric woven from reinforcing fibers is provided as a reinforcing material between each domed part and the fiber-reinforced-plastic layer (e.g., see Japanese Patent Application Publication No. 2004-263827).

SUMMARY

When forming a fiber-reinforced-plastic layer by helically winding reinforcing fibers reeled out from a manufacturing apparatus that is disposed in a state of being fixed relative to a vessel main body, preventing the reinforcing fibers from slipping over an outer circumferential surface of a domed part requires winding the reinforcing fibers at such a winding angle that the reinforcing fibers run along a geodesic line (the shortest route) on the domed part. Thus, no flexibility is allowed in setting the angle at which the reinforcing fibers are wound around the vessel main body, and a large amount of reinforcing fibers are required to achieve desired strength, which contributes to increasing the manufacturing cost of the pressure vessel.

Therefore, the present disclosure can provide a pressure vessel and a manufacturing method thereof that can keep the manufacturing cost down.

A pressure vessel of a first aspect according to the present disclosure includes: a vessel main body having a cylindrical straight body part, a first domed part and a second domed part, the first domed part including a first hemispherical portion, the second domed part including a second hemispherical portion, the first hemispherical portion and the second hemispherical portion having hemispherical shapes and being integrally formed at each end of the straight body part; a first reinforced section formed by winding reinforcing fibers around an outer circumferential surface of the first domed part such that the reinforcing fibers are interlaced with each other; a second reinforced section formed by winding the reinforcing fibers helically around an outer circumferential surface of the straight body part, continuously from the first reinforced section; and a third reinforced section formed by winding the reinforcing fibers around an outer circumferential surface of the second domed part such that the reinforcing fibers are interlaced with each other, continuously from the second reinforced section.

According to the first aspect, the reinforcing fibers are helically wound around the outer circumferential surface of the straight body part, while the reinforcing fibers are wound so as to be interlaced with each other around the outer circumferential surfaces of the first domed part and the second domed part. Thus, the reinforcing fibers are less likely to slip over the outer circumferential surfaces of the first domed part and the second domed part, so that it is not necessary to wind the reinforcing fibers at such a winding angle that the reinforcing fibers run along a geodesic line (the shortest route). In the manufacture of the pressure vessel, therefore, flexibility is allowed in setting the angle at which the reinforcing fibers are wound around the vessel main body (straight body part), and desired strength can be achieved by a required minimum amount of reinforcing fibers. As a result, the manufacturing cost of the pressure vessel is kept down.

A pressure vessel of a second aspect is a pressure vessel according to the first aspect, wherein, as seen from a direction orthogonal to an axial direction of a central axis of the vessel main body, the first reinforced section may transition to the second reinforced section on the side of a first axial end of the central axis from a first border between the straight body part and the first domed part, and the second reinforced section may transition to the third reinforced section on the side of a second axial end of the central axis from a second border between the straight body part and the second domed part.

According to the second aspect, the reinforcing fibers wound around the straight body part are not interlaced with each other. Thus, compared with if the reinforcing fibers wound around the straight body part are also interlaced with each other, the required amount of reinforcing fibers is reduced, and the manufacturing cost is further kept down.

A pressure vessel of a third aspect is a pressure vessel according to the second aspect, wherein, as seen from the direction orthogonal to the axial direction of the central axis of the vessel main body, the first reinforced section may transition to the second reinforced section on the side of an axial center of the central axis from a first specific portion in an outer circumferential surface of the first hemispherical portion that is determined by a winding angle, relative to the central axis, of the reinforcing fibers wound around the straight body part, and the second reinforced section may transition to the third reinforced section on a side of the axial center of the central axis from a second specific portion in an outer circumferential surface of the second hemispherical portion that is determined by the winding angle, relative to the central axis, of the reinforcing fibers wound around the straight body part.

According to the third aspect, the reinforcing fibers are wound at the same winding angle around the outer circumferential surfaces of the first and second hemispherical portions and the outer circumferential surface of the straight body part. Thus, the reinforcing fibers are wound with good continuity from the outer circumferential surface of the first hemispherical portion to the outer circumferential surface of the straight body part, and from the outer circumferential surface of the straight body part to the outer circumferential surface of the second hemispherical portion, which improves the productivity of the pressure vessel.

A pressure vessel of a fourth aspect is a pressure vessel according to the third aspect, wherein, as seen from the direction orthogonal to the axial direction of the central axis of the vessel main body, the first specific portion may be an imaginary circumference passing through an imaginary intersection point between the outer circumferential surface of the first hemispherical portion and the reinforcing fibers wound at the winding angle and passing through an intersection point between the first border and the central axis, and as seen from the direction orthogonal to the axial direction of the central axis of the vessel main body, the second specific portion may be an imaginary circumference passing through an imaginary intersection point between the outer circumferential surface of the second hemispherical portion and the reinforcing fibers wound at the winding angle and passing through an intersection point between the second border and the central axis.

According to the fourth aspect, compared with if the specific portions are not the imaginary circumferences, the reinforcing fibers are wound with better continuity from the outer circumferential surface of the first hemispherical portion to the outer circumferential surface of the straight body part, and from the outer circumferential surface of the straight body part to the outer circumferential surface of the second hemispherical portion. As a result, the productivity of the pressure vessel improves.

A pressure vessel of a fifth aspect is a pressure vessel according to any one of the first to fourth aspects, wherein: the first domed part may include a first cylindrical portion protruding toward a first axial end of a central axis of the vessel main body; the second domed part may include a second cylindrical portion protruding toward a second axial end of the central axis of the vessel main body; and as seen from a direction orthogonal to an axial direction of the central axis of the vessel main body, an angle, relative to the central axis, of an imaginary tangential line passing through a terminal end, on the side of the first hemispherical portion, of a first curved surface continuing from the first cylindrical portion to the first hemispherical portion may be equal to or smaller than a winding angle, relative to the central axis, of the reinforcing fibers wound around the straight body part, and an angle, relative to the central axis, of an imaginary tangential line passing through a terminal end, on the side of the second hemispherical portion, of a second curved surface continuing from the second cylindrical portion to the second hemispherical portion may be equal to or smaller than the winding angle.

According to the fifth aspect, it is easy to wind the reinforcing fibers around the outer circumferential surfaces of the first and second hemispherical portions at the same winding angle as around the outer circumferential surface of the straight body part, so that the reinforcing fibers are wound with better continuity from the outer circumferential surface of the first hemispherical portion to the outer circumferential surface of the straight body part, and from the outer circumferential surface of the straight body part to the outer circumferential surface of the second hemispherical portion. As a result, the productivity of the pressure vessel improves.

A pressure vessel of a sixth aspect is a pressure vessel according to any one of the first to fifth aspects, wherein, as seen from a direction orthogonal to an axial direction of a central axis of the vessel main body, a winding angle, relative to the central axis, of the reinforcing fibers wound around the straight body part may be within a range of 54.7 degrees±10 degrees.

According to the sixth aspect, the winding angle of the reinforcing fibers wound around the straight body part is within the range of 543 degrees±10 degrees. Here, the value "54.7 degrees" is determined based on stresses acting on the straight body part in a circumferential direction and an axial direction. Thus, the straight body part is reinforced more appropriately, compared with if the winding angle of the reinforcing fibers wound around the straight body part is not within the range of 543 degrees±10 degrees.

A pressure vessel manufacturing method of a seventh aspect is a method in which a vessel main body having a cylindrical straight body part, a first domed part and a second domed part, the first domed part including a first hemispherical portion, the second domed part including a second hemispherical portion, the first hemispherical portion and the second hemispherical portion having hemispherical shapes and being integrally formed at each end of the straight body part, is wound with reinforcing fibers to reinforce the vessel main body. This method includes: a first step of winding the reinforcing fibers around an outer circumferential surface of the first domed part such that the reinforcing fibers are interlaced with each other; a second step of helically winding the reinforcing fibers around an outer circumferential surface of the straight body part, continuously from the first step; and a third step of winding the reinforcing fibers around an outer circumferential surface of the second domed part such that the reinforcing fibers are interlaced with each other, continuously from the second step.

According to the seventh aspect, the reinforcing fibers are helically wound around the outer circumferential surface of the straight body part, while the reinforcing fibers are wound so as to be interlaced with each other around the outer circumferential surfaces of the first and second domed parts. Thus, the reinforcing fibers are less likely to slip over the outer circumferential surfaces of the first and second domed parts, so that it is not necessary to wind the reinforcing fibers at such a winding angle that the reinforcing fibers run along a geodesic line (the shortest route). In the manufacture of the pressure vessel, therefore, flexibility is allowed in setting the angle at which the reinforcing fibers are wound around the vessel main body (straight body part), and desired strength can be achieved by a required minimum amount of reinforcing fibers. As a result, the manufacturing cost of the pressure vessel is kept down.

A pressure vessel manufacturing method of an eighth aspect is a pressure vessel manufacturing method according to the seventh, aspect, wherein, as seen from a direction orthogonal to an axial direction of a central axis of the vessel main body, the first step may transition to the second step on a side of a first axial end of the central axis from a first border between the straight body part and the first domed part, and the second step may transition to the third step on a side of a second axial end of the central axis from a second border between the straight body part and the second domed part.

According to the eighth aspect, the reinforcing fibers wound around the straight body part are not interlaced with each other. Thus, compared with if the reinforcing fibers wound around the straight body part are also interlaced with each other, the required amount of reinforcing fibers is reduced and the manufacturing cost is further kept down.

A pressure vessel manufacturing method of a ninth aspect is a pressure vessel manufacturing method according to the eighth aspect, wherein, as seen from the direction orthogonal to the axial direction of the central axis of the vessel main body, the first step may transition to the second step on a side of an axial center of the central axis from a first specific portion in an outer circumferential surface of the first hemispherical portion that is determined by a winding angle, relative to the central axis, of the reinforcing fibers wound around the straight body part, and the second step may transition to the third step on a side of the axial center of the central axis from a second specific portion in an outer circumferential surface of the second hemispherical portion that is determined by the winding angle, relative to the central axis, of the reinforcing fibers wound around the straight body part.

According to the ninth aspect, the reinforcing fibers are wound at the same winding angle around the outer circumferential surfaces of the first and second hemispherical portions and the outer circumferential surface of the straight body part. Thus, the reinforcing fibers are wound with good continuity from the outer circumferential surface of the first hemispherical portion to the outer circumferential surface of the straight body part, and from the outer circumferential surface of the straight body part to the outer circumferential surface of the second hemispherical portion, which improves the productivity of the pressure vessel.

A pressure vessel manufacturing method of a tenth aspect is a pressure vessel manufacturing method according to the ninth aspect, wherein, as seen from the direction orthogonal to the axial direction of the central axis of the vessel main body, the first specific portion may be an imaginary circumference passing through an imaginary intersection point between the outer circumferential surface of the first hemispherical portion and the reinforcing fibers wound at the winding angle and passing through an intersection point between the first border and the central axis, and the second specific portion may be an imaginary circumference passing through an imaginary intersection point between the outer circumferential surface of the second hemispherical portion and the reinforcing fibers wound at the winding angle and passing through an intersection point between the second border and the central axis.

According to the tenth aspect, compared with if the first and second specific portions are not the imaginary circumferences, the reinforcing fibers are wound with better continuity from the outer circumferential surface of the first hemispherical portion to the outer circumferential surface of the straight body part, and from the outer circumferential surface of the straight body part to the outer circumferential surface of the second hemispherical portion. As a result, the productivity of the pressure vessel improves.

A pressure vessel manufacturing method of an eleventh aspect is a pressure vessel manufacturing method according to any one of the seventh to tenth aspects, wherein, as seen from a direction orthogonal to an axial direction of a central axis of the vessel main body, a winding angle, relative to the central axis, of the reinforcing fibers wound around the straight body part may be within a range of 54.7 degrees±10 degrees.

According to the eleventh aspect, the winding angle of the reinforcing fibers wound around the straight body part is within the range of 54.7 degrees±10 degrees. Here, the value "54.7 degrees" is determined based on stresses acting on the straight body part in a circumferential direction and an axial direction. Thus, the straight body part is reinforced more appropriately, compared with if the winding angle of the reinforcing fibers wound around the straight body part is not within the range of 54.7 degrees±10 degrees.

The above aspects can keep the manufacturing cost of the pressure vessel down.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

In the following, an embodiment according to the present disclosure will be described in detail based on the drawings. The arrows X in FIG. 1 indicate sides farther away from a center O of a pressure vessel 10 (vessel main body 12) in an axial direction of a central axis CL of the pressure vessel 10, and these farther side will be referred to as "axial end sides." Hereinafter, the side of an axial end of the central axis CL on the side of a first domed part 16 of the pressure vessel 10 to be described later will also be referred to as a "first axial end side," and the side of an axial end of the central axis CL on the side of a second domed part 18 of the pressure vessel 10 will also be referred to as a "second axial end side." Conversely, the side nearer to the center O of the pressure vessel 10 (vessel main body 12) will be referred to as an "axial center side." The pressure vessel 10 according to this embodiment is intended, for example, to be filled with hydrogen as fuel and installed in a fuel cell vehicle (not shown) or the like.

Figure 1:
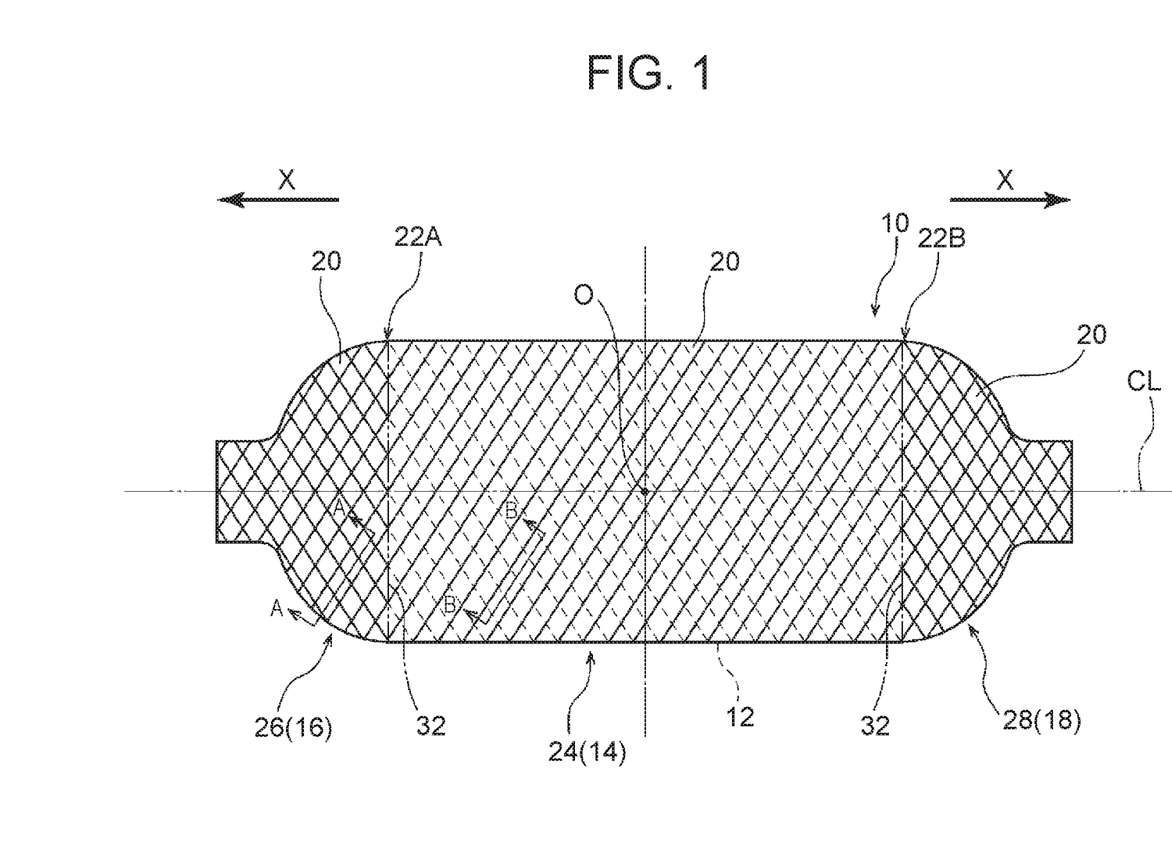
FIG. 1 is a front view schematically showing a pressure vessel according to an embodiment.
Figure 2:
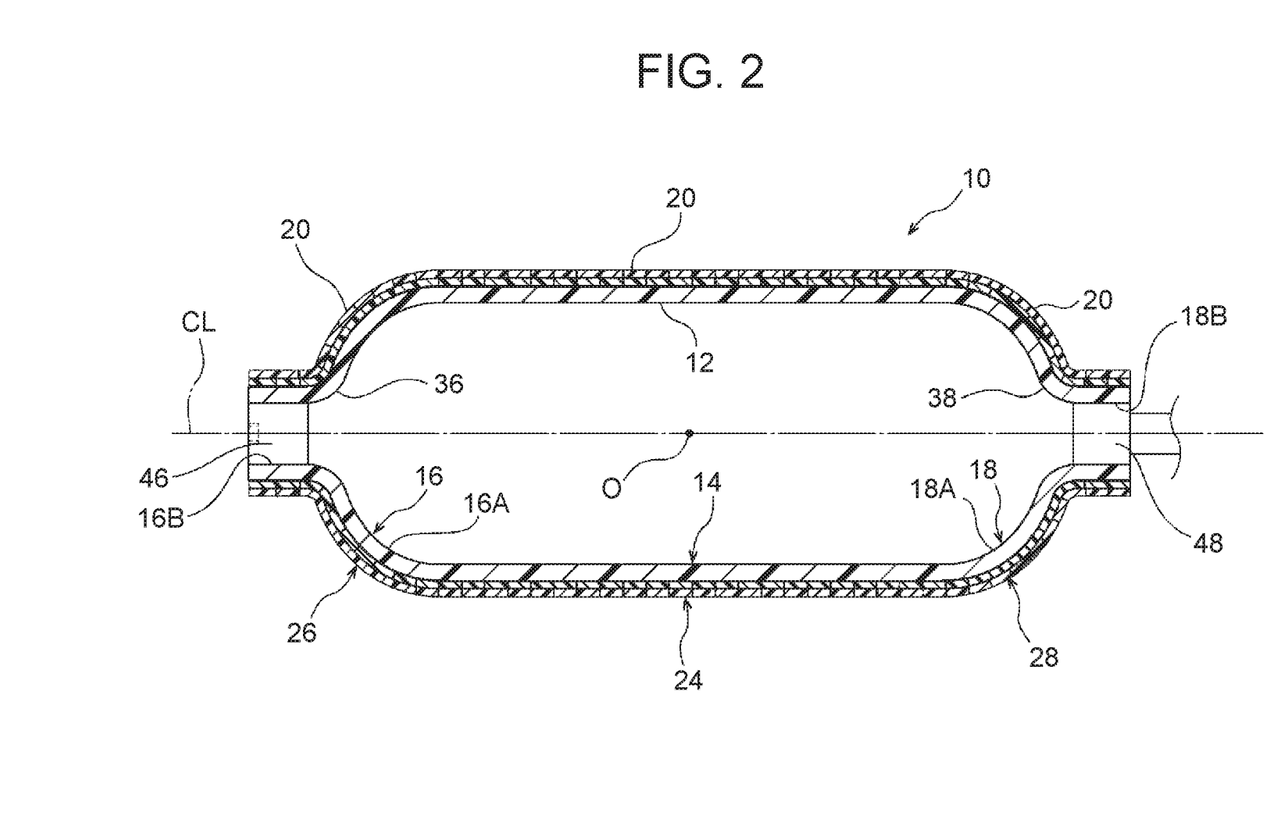
FIG. 2 is a sectional view schematically showing the structure of the pressure vessel according to the embodiment.

As shown in FIG. 1 and FIG. 2, the pressure vessel 10 has the vessel main body 12 called a liner. For example, the vessel main body 12 is blow-molded from a liquid crystal resin material that is excellent in both gas barrier property and dimensional stability. The vessel main body 12 has a cylindrical straight body part 14, and the first domed part 16 and the second domed part 18 respectively including a first hemispherical portion 16A and a second hemispherical portion 18A that have substantially hemispherical shapes and are integrally formed one at each end of the straight body part 14. Hereinafter, the first hemispherical portion 16A and the second hemispherical portion 18A will also be collectively referred to as "hemispherical portions 16A, 18A," and the first domed part 16 and the second domed part 18 will also be collectively referred to as "domed parts 16, 18."

The pressure vessel 10 has reinforcing fibers 20, in the shape of a tape with a predetermined width, wound in layers around an outer circumferential surface of the straight body part 14 and outer circumferential surfaces of the domed parts 16, 18. To be more specific, the reinforcing fibers 20 are made of fiber-reinforced plastics (FRP) containing glass fibers, carbon fibers, aramid fibers, or the like, and an FRP layer as a fiber-reinforced-plastic layer is formed on an outer circumferential surface of the vessel main body 12.

Figure 3:
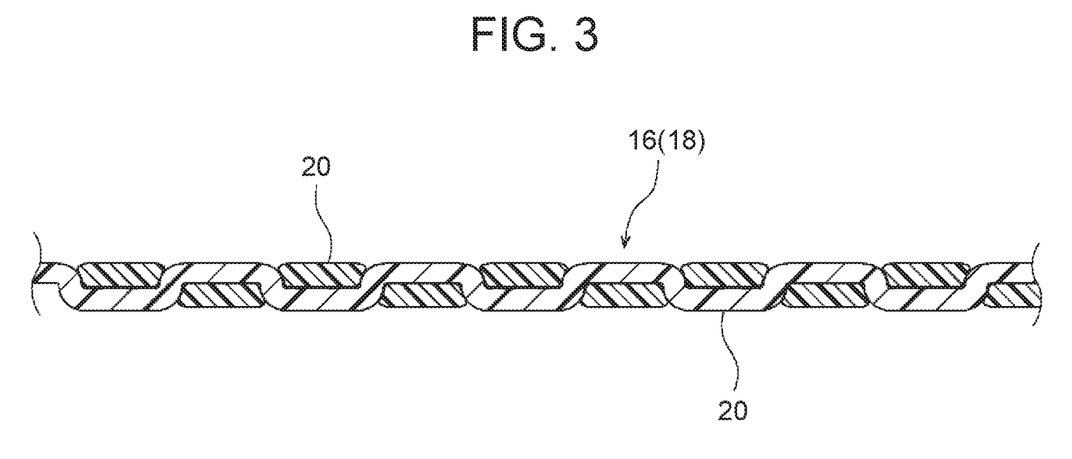
FIG. 3 is a view along arrowed line A-A in FIG. 1, showing a cross-section of reinforcing fibers in a domed part of the pressure vessel according to the embodiment.

Specifically, as shown in FIG. 1 and FIG. 3, the reinforcing fibers 20 are wound so as to be interlaced with each other (hereinafter also referred to as "braid winding") around the outer circumferential surface of the first domed part 16, and a first reinforced section 26 that is an FRP layer is formed by the braid-wound reinforcing fibers 20.

Similarly, the reinforcing fibers 20 are wound so as to be interlaced with each other (hereinafter also referred to as "braid winding") around the outer circumferential surface of the second domed part 18, and a third reinforced section 28 that is an FRP layer is formed by the braid-wound reinforcing fibers 20.

Figure 4:
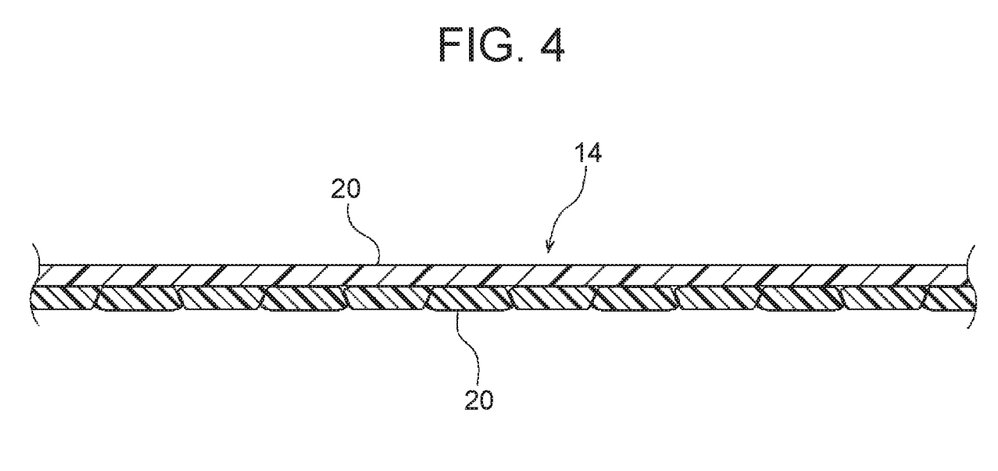
FIG. 4 is a view along arrowed line B-B in FIG. 1, showing a cross-section of reinforcing fibers in a straight body part of the pressure vessel according to the embodiment.

Moreover, as shown in FIG. 1 and FIG. 4, the reinforcing fibers 20 are helically wound (hereinafter also referred to as "helical winding") around the outer circumferential surface of the straight body part 14, and a second reinforced section 24 that is an FRP layer is formed by the helically wound reinforcing fibers 20.

Figure 5:
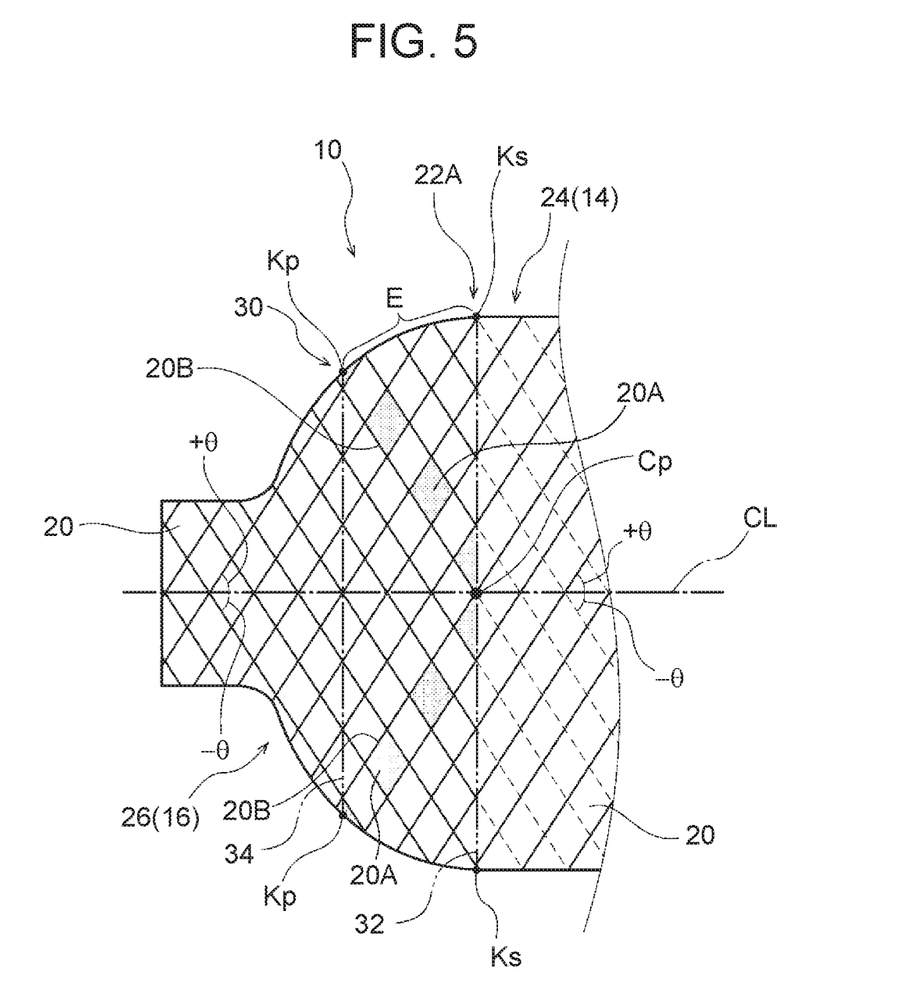
FIG. 5 is an enlarged front view showing a border between the domed part and the straight body part of the pressure vessel according to the embodiment.

As shown in FIG. 5, the helical winding refers to winding the reinforcing fibers 20 around the entire outer circumferential surface of the straight body part 14 at a predetermined winding angle θ (−θ) relative to the central axis CL of the vessel main body 12, and then further winding the reinforcing fibers 20 on top of that (on top of the reinforcing fibers 20 having been wound at the angle −θ) at the predetermined winding angle θ (+θ) relative to the central axis CL of the vessel main body 12. Thus, the second reinforced section 24 is formed as the reinforcing fibers 20 are wound at the predetermined winding angles −θ and +θ in at least two layers around the outer circumferential surface of the straight body part 14.

As described above, the braid winding refers to winding the reinforcing fibers 20 so as to be interlaced with each other, and winding the reinforcing fibers 20 at the predetermined winding angles −θ and +θ relative to the central axis CL of the vessel main body 12. Thus, both the braid winding and the helical winding are winding at the same winding angle θ, and the winding angle θ is, including a tolerance, within a range of θ=54.7 degrees±10 degrees, within a range of θ=54.7 degrees±5 degrees, or within a range of θ=54.7 degrees±1 degree.

The winding angle θ is an angle derived from a stress occurring when a predetermined internal pressure is acting on the straight body part 14, and is an angle attributable to the fact that a stress acting on the vessel main body 12 in a circumferential direction is twice as large as a stress acting thereon in a longitudinal axial direction. Although the detailed calculation formula will be omitted, when the winding angle θ according to the stress is calculated based on the netting theory, θ=54.7 degrees (equilibrium angle) is derived from $\tan^2 θ = 2$.

Since a stress occurring in the domed parts 16, 18 when an internal pressure is acting is smaller than that in the straight body part 14, the domed parts 16, 18 require a lower level of reinforcement than the straight body part 14. Therefore, the braid winding that has lower strength than the helical winding is used for the domed parts 16, 18, while the helical Winding that has higher strength than the braid winding is used for the straight body part 14.

As shown in FIG. 5, a position at which the first reinforced section 26 transitions to the second reinforced section 24 is located, on a first border 22A between the straight body part 14 and the first domed part 16 (on a first imaginary circumference 32 to be described later), as seen from a direction orthogonal to the axial direction of the central axis CL of the vessel main body 12. However, the position of transition from the first reinforced section 26 to the second reinforced section 24 is not limited to this position.

Figure 6:
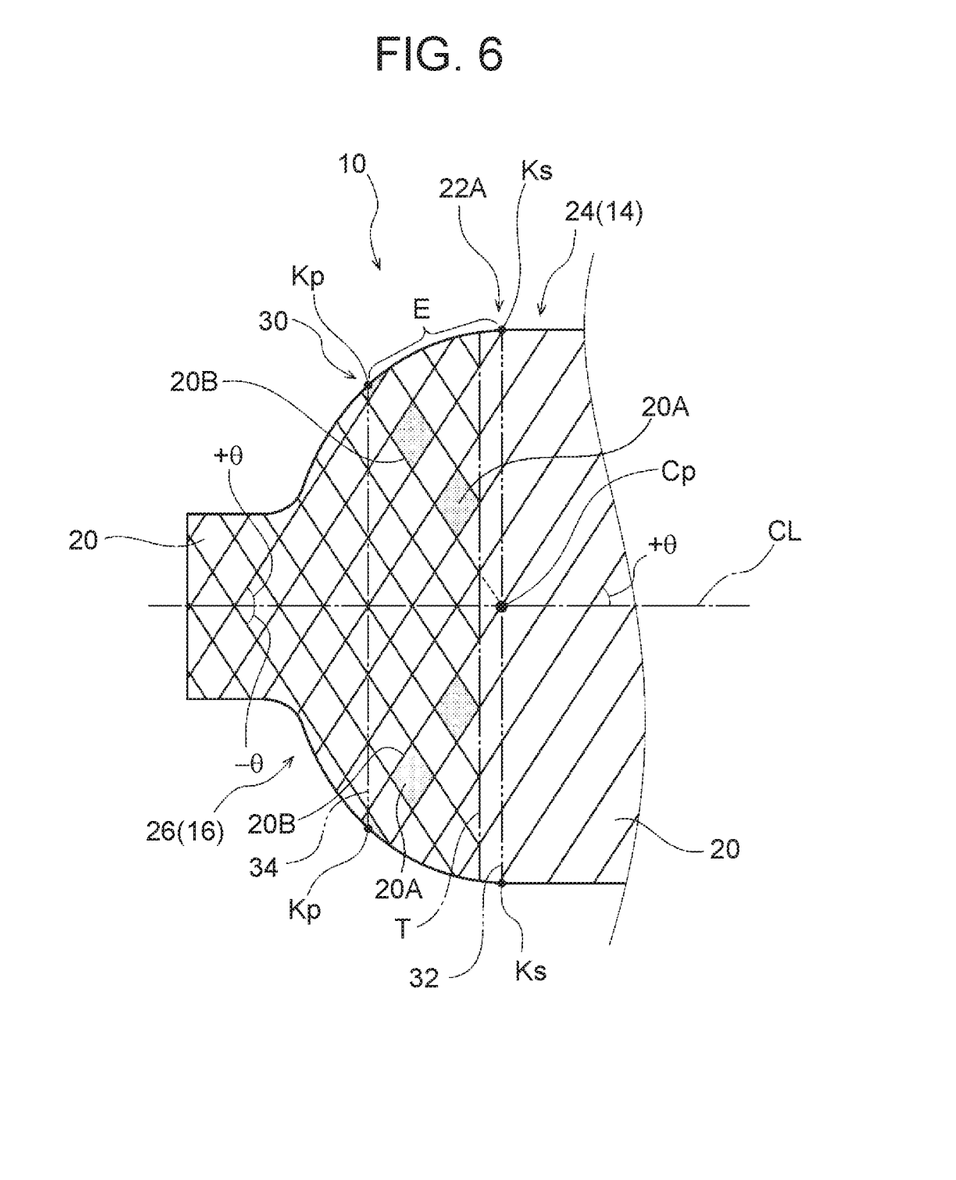
FIG. 6 is an enlarged front view of another border between the domed part and the straight body part of the pressure vessel according to the embodiment.

For example, as shown in FIG. 6, the first reinforced section 26 may transition to the second reinforced section 24 on the side of the first axial end of the central axis CL from the first border 22A between the straight body part 14 and the first domed part 16 (at the position indicated by the long dashed-short dashed line T), as seen from the direction orthogonal to the axial direction of the central axis CL of the vessel main body 12. The first border 22A here refers to the first imaginary circumference 32 passing through an imaginary border point Ks between the straight body part 14 and the first domed part 16 (a point at which the curvature becomes zero).

As shown in FIG. 5 and FIG. 6, the position at which the first reinforced section 26 transitions to the second reinforced section 24 is located on the axial center side from a first specific portion 30 in an outer circumferential surface of the first hemispherical portion 16A that is determined by the winding angle θ (±θ), relative to the central axis CL, of the reinforcing fibers 20 wound around the straight body part 14, as seen from the direction orthogonal to the axial direction of the central axis CL of the vessel main body 12.

The first specific portion 30 here refers to a second imaginary circumference 34 passing through an imaginary intersection point Kp between the outer circumferential surface of the first hemispherical portion 16A and a first axial end-side edge 20B of reinforcing fibers 20A (represented by dotted portions), of the reinforcing fibers 20 wound at the winding angle θ, that passes through an intersection point Cp between the first imaginary circumference 32 and the central axis CL, as seen from the direction orthogonal to the axial direction of the central axis CL of the vessel main body 12.

Thus, as shown in FIG. 5 and FIG. 6, the position of transition from the first reinforced section 26 to the second reinforced section 24 may be any position inside a region E between the second imaginary circumference 34 and the first imaginary circumference 32 (the region on the axial center side from the first specific portion 30 including the first specific portion 30 and on the first axial end side from the first border 22A including the first border 22A). The same description applies to transition from the second reinforced section 24 to the third reinforced section 28 (not shown). Specifically, the second reinforced section 24 transitions to the third reinforced section 28 on the side of the second axial end of the central axis CL from a second border 22B between the straight body part 14 and the second domed part 18. However, the position of transition is not limited to this position. The second reinforced section 24 may transition to the third reinforced section 28 on the side of the axial center of the central axis CL from a second specific portion in an outer circumferential surface of the second hemispherical portion 18A that is determined by the winding angle θ (±θ), relative to the central axis CL, of the reinforcing fibers 20 wound around the straight body part 14.

As shown in FIG. 2, the first domed part 16 includes, at an axial center portion thereof, a first cylindrical portion 16B protruding toward the first axial end of the central axis CL of the vessel main body 12. The second domed part 18 includes, at an axial center portion thereof, a second cylindrical portion 18B protruding toward the second axial end of the central axis CL of the vessel main body 12. For example, a sealing plug 46 is fitted in the first cylindrical portion 16B, while a closure plug 48 is fitted in the second cylindrical portion 18B and a valve (not shown) is attached to the closure plug 48.

Figure 7:
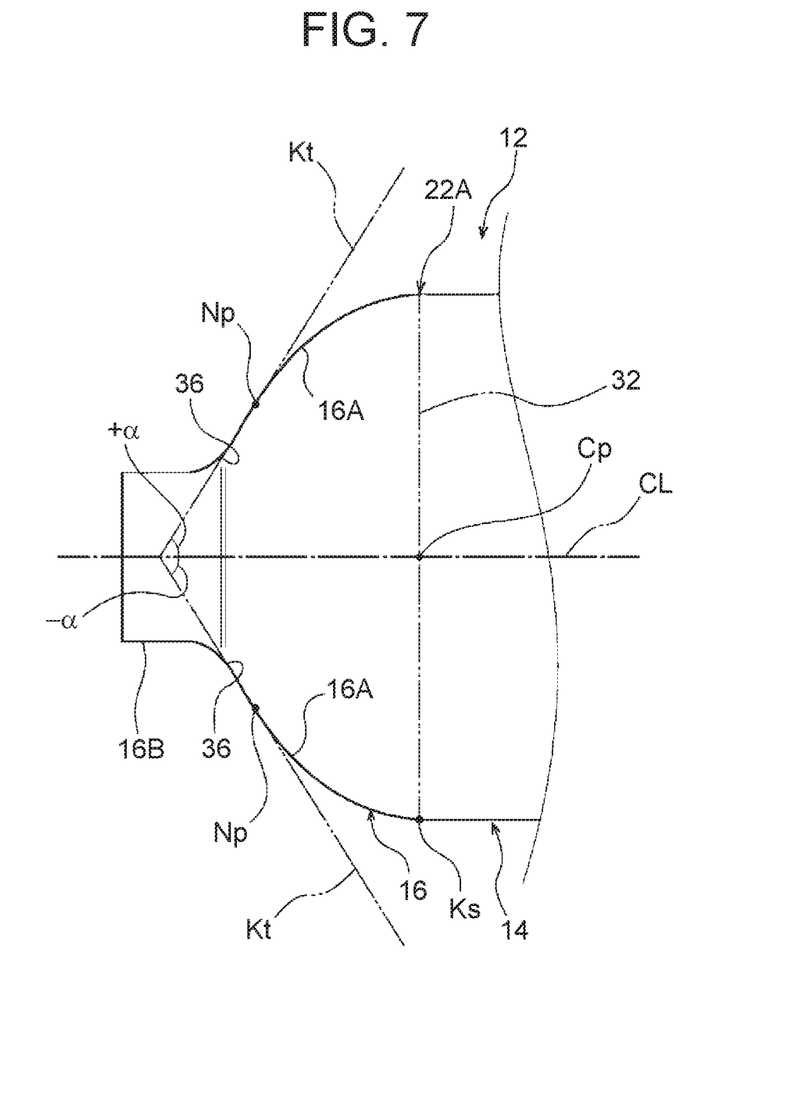
FIG. 7 is an enlarged front view of the border between the domed part and the straight body part of a vessel main body constituting a part of the pressure vessel according to the embodiment.

As shown in FIG. 7, an angle α, relative to the central axis CL, of an imaginary tangential line Kt passing through a terminal end Np, on the side of the first hemispherical portion 16A, of a first curved surface 36 of the first domed part 16 continuing from the first cylindrical portion 16B to the first hemispherical portion 16A is equal to or smaller than the winding angle θ, relative to the central axis CL, of the reinforcing fibers 20 wound around the straight body part 14 (α≤θ), as seen from the direction orthogonal to the axial direction of the central axis CL of the vessel main body 12.

The same description applies to the second domed part 18. Specifically, an angle α, relative to the central axis CL, of an imaginary tangential line Kt passing through a terminal end Np, on the side of the second hemispherical portion 18A, of a second curved surface 38 (see FIG. 2) of the second domed part 18 continuing from the second cylindrical portion 18B to the second hemispherical portion 18A is equal to or smaller than the winding angle θ, relative to the central axis CL, of the reinforcing fibers 20 wound around the straight body part 14 (α≤θ). The "terminal end Np" here includes an inflection point between the first curved surface 36 and the first hemispherical portion 16A and an inflection point between the second curved surface 38 and the second hemispherical portion 18A.

Figure 8:
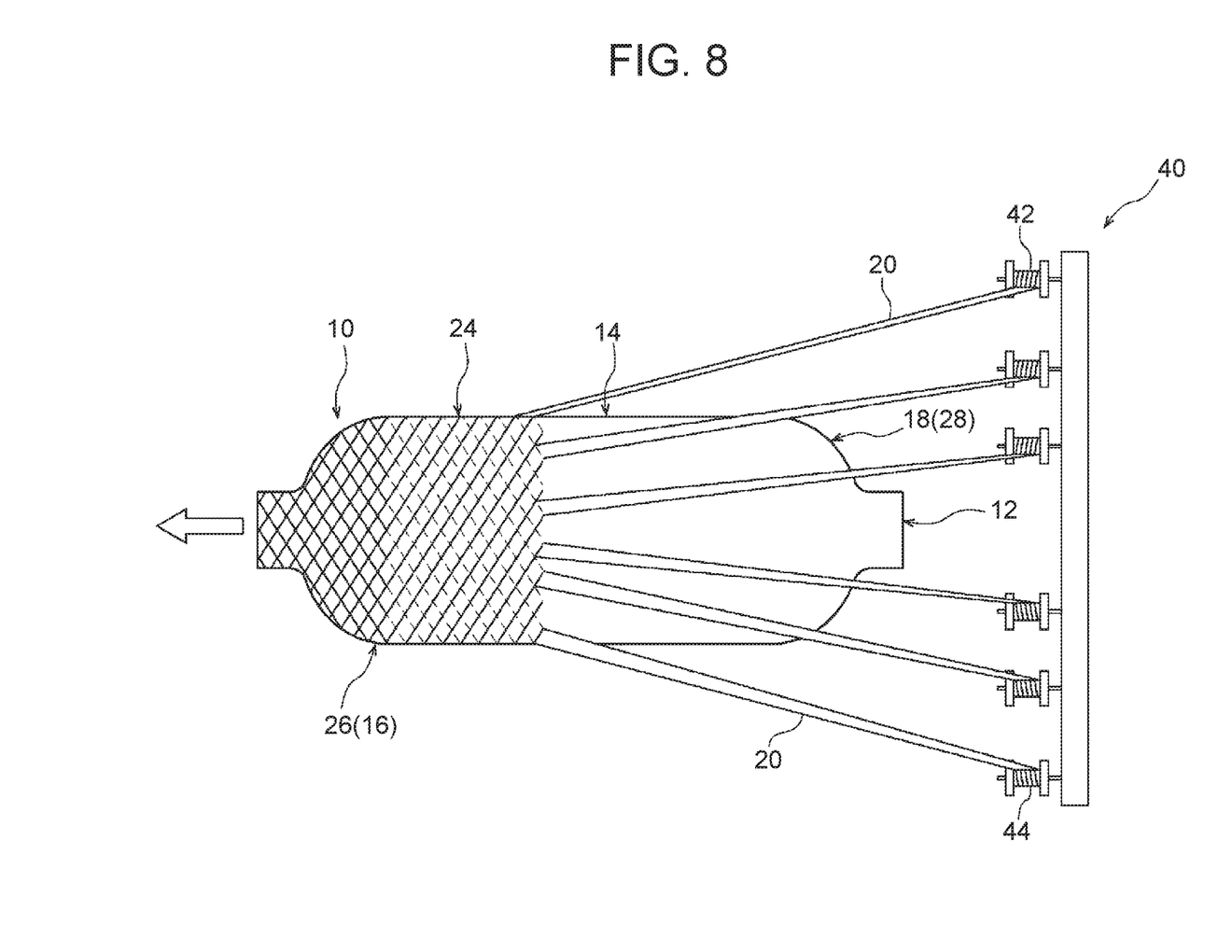
FIG. 8 is a schematic view showing a manufacturing apparatus that winds the reinforcing fibers around the vessel main body constituting a part of the pressure vessel according to the embodiment.
Figure 9A:
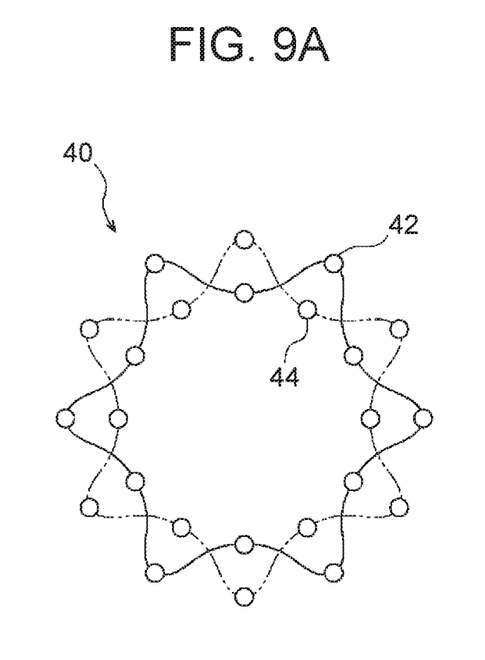
FIG. 9A is a schematic view showing positions from which the reinforcing fibers are reeled out to wind the reinforcing fibers around the domed part of the pressure vessel according to the embodiment.
Figure 9B:
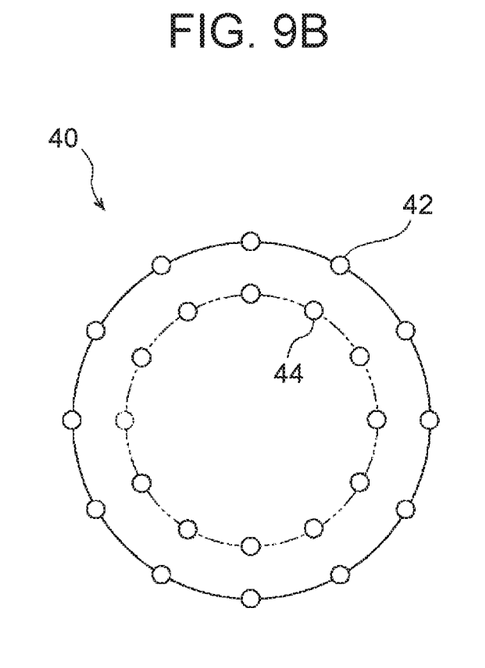
FIG. 9B is a schematic view showing positions from which the reinforcing fibers are reeled out to wind the reinforcing fibers around the straight body part of the pressure vessel according to the embodiment.

As shown in FIG. 8, the reinforcing fibers 20 are wound around the outer circumferential surface of the vessel main body 12 by a publicly known manufacturing apparatus 40. As shown in FIG. 9A and FIG. 9B, the manufacturing apparatus 40 has pluralities of bobbins 42, 44 disposed in two rows on a circumference, and the reinforcing fibers 20 reeled out from the bobbins 42, 44 in the respective rows are sequentially wound around the outer circumferential surface of the first domed part 16, the outer circumferential surface of the straight body part 14, and the outer circumferential surface of the second domed part 18 of the vessel main body 12 that is moved in the axial direction of the central axis CL (the leftward direction in FIG. 8).

As shown in FIG. 9A, to braid-wind the reinforcing fibers 20 around the first domed part 16 and the second domed part 18, the bobbins 42 linked together by the solid line and the bobbins 44 linked together by the imaginary line (long dashed-double short dashed line) are disposed in a circumferential direction so as to alternate with each other on a radially inner side and a radially outer side. The manufacturing apparatus 40 is driven such that the bobbins 42 linked together by the solid line and the bobbins 44 linked together by the imaginary line are moved from the radially inner side to the radially outer side and from the radially outer side to the radially inner side, so as to sequentially alternate with each other, while the bobbins 42, 44 are moved in the opposite directions (opposite circumferential directions).

Thus, the solid line represents a moving path of the bobbins 42 and the imaginary line represents a moving path of the bobbins 44.

As shown in FIG. 9B, to helically wind the reinforcing fibers 20 around the straight body part 14, the bobbins 42 linked together by the solid line and the bobbins 44 linked together by the imaginary line are disposed in the circumferential direction, respectively on the radially outer side and the radially inner side. The manufacturing apparatus 40 is driven such that the bobbins 42 linked together by the solid line and the bobbins 44 linked together by the imaginary line are moved in the opposite directions (opposite circumferential directions).

Next, effects of the pressure vessel 10 configured as has been described above will be described.

As shown in FIG. 8, FIG. 9A, and FIG. 9B, the pressure vessel 10 according to this embodiment is formed as the reinforcing fibers 20 are wound around the outer circumferential surface of the vessel main body 12. Specifically, the reinforcing fibers 20 are sequentially reeled out from the bobbins 42, 44, and first, the reinforcing fibers 20 are braid-wound around the outer circumferential surface of the first domed part 16 to form the first reinforced section 26 (first step).

Thus, the reinforcing fibers 20 are less likely to slip over the outer circumferential surface of the first domed part 16, so that it is not necessary to wind the reinforcing fibers 20 at such a winding angle that the reinforcing fibers 20 run along a geodesic line (the shortest route). In the manufacture of the pressure vessel 10, therefore, flexibility is allowed in setting the angle at which the reinforcing fibers 20 are wound around the vessel main body 12 (straight body part 14), and desired strength can be achieved by a required minimum amount of reinforcing fibers 20. As a result, the manufacturing cost and the mass of the pressure vessel 10 can be kept down.

When the braid winding of the reinforcing fibers 20 around the outer circumferential surface of the first domed part 16 has been completed, subsequently, the reinforcing fibers 20 are helically wound around the outer circumferential surface of the straight body part 14 to form the second reinforced section 24 (second step). The transition from the braid winding in the first domed part 16 to the helical winding in the straight body part 14 is made in the region E between the second imaginary circumference 34 (first specific portion 30) and the first imaginary circumference 32 (first border 22A).

Here, the second imaginary circumference 34 includes the imaginary intersection point Kp that is determined by the optimal winding angle θ of the reinforcing fibers 20 for the straight body part 14. In the region E, therefore, the reinforcing fibers 20 can transition smoothly from the braid winding to the helical winding at the same winding angle θ. Thus, the reinforcing fibers 20 are wound with good continuity from the outer circumferential surface of the first hemispherical portion 16A to the outer circumferential surface of the straight body part 14, which can improve the productivity of the pressure vessel 10.

In the first domed part 16, the angle α, relative to the central axis CL, of the imaginary tangential line Kt passing through the terminal end Np, on the side of the first hemispherical portion 16A, of the first curved surface 36 continuing from the first cylindrical portion 16B to the first hemispherical portion 16A is equal to or smaller than the winding angle θ, relative to the central axis CL, of the reinforcing fibers 20 wound around the straight body part 14 (see FIG. 7).

Thus, it is easy to wind the reinforcing fibers 20 around the outer circumferential surface of the first hemispherical portion 16A at the same winding angle θ as around the outer circumferential surface of the straight body part 14, so that the reinforcing fibers 20 are wound with better continuity from the outer circumferential surface of the first hemispherical portion 16A to the outer circumferential surface of the straight body part 14. As a result, the productivity of the pressure vessel 10 can be further improved.

Since the helical winding instead of the braid winding is used for the straight body part 14, the required amount of reinforcing fibers 20 can be reduced compared with if the braid winding is used also for the straight body part 14. Thus, the manufacturing cost and the mass of the pressure vessel 10 can be further kept down. Moreover, since the reinforcing fibers 20 are thus not bent in the straight body part 14, the strength of the second reinforced section 24 that most requires strength can be appropriately secured (The straight body part 14 can be appropriately reinforced).

When the helical winding of the reinforcing fibers 20 around the outer circumferential surface of the straight body part 14 has been completed, subsequently, the reinforcing fibers 20 are braid-wound around the outer circumferential surface of the second domed part 18 to form the third reinforced section 28 (third step). Thus, the reinforcing fibers 20 are less likely to slip also over the outer circumferential surface of the second domed part 18, so that it is not necessary to wind the reinforcing fibers 20 at such a winding angle that the reinforcing fibers 20 run along a geodesic line (the shortest route).

As a result, again, the manufacturing cost and the mass of the pressure vessel 1 can be kept down. The transition from the helical winding in the straight body part 14 to the braid winding in the second domed part 18 is also made in the region of the second domed part 18 between a first imaginary circumference (second border 22B) similar to the first imaginary circumference 32 and a second imaginary circumference (second specific portion) similar to the second imaginary circumference 34.

As with the first domed part 16, the second imaginary circumference of the second domed part 18 similar to the second imaginary circumference 34 includes an imaginary intersection point that is determined by the optimal winding angle θ of the reinforcing fibers 20 for the straight body part 14. In the above region, therefore, the reinforcing fibers 20 can transition smoothly from the helical winding to the braid winding at the same winding angle θ. Thus, the reinforcing fibers 20 are wound with good continuity from the outer circumferential surface of the straight body part 14 to the outer circumferential surface of the second hemispherical portion 18A, which can improve the productivity of the pressure vessel 10.

As in the first domed part 16, so in the second domed part 18, the angle, relative to the central axis CL, of the imaginary tangential line passing through the terminal end, on the side of the second hemispherical portion 18A, of the second curved surface 38 continuing from the second cylindrical portion 18B to the second hemispherical portion 18A is equal to or smaller than the winding angle θ, relative to the central axis CL, of the reinforcing fibers 20 wound around the straight body part 14.

Thus, it is easy to wind the reinforcing fibers 20 around the outer circumferential surface of the second hemispherical portion 18A at the same winding angle θ as around the outer circumferential surface of the straight body part 14, so that the reinforcing fibers 20 are wound with better continuity from the outer circumferential surface of the straight body part 14 to the outer circumferential surface of the second hemispherical portion 18A. As a result, the productivity of the pressure vessel 10 can be further improved.

The winding angle θ of the reinforcing fibers 20 wound around the straight body part 14 is within the range of 54.7 degrees±10 degrees. This value "54.7 degrees" is an angle (equilibrium angle) derived from a stress occurring when a predetermined internal pressure is acting on the straight body part 14. Further, "±10 degrees" is a tolerance allowed in actually winding the reinforcing fibers 20. Thus, the straight body part 14 can be reinforced more appropriately, compared with if the winding angle θ of the reinforcing fibers 20 wound around the straight body part 14 is not within the range of 54.7 degrees±10 degrees.

When the reinforcing fibers 20 have been thus wound around the vessel main body 12 and the first reinforced section 26, the second reinforced section 24, and the third reinforced section 28 have been formed, the reinforcing fibers 20 forming the first reinforced section 26, the second reinforced section 24, and the third reinforced section 28 are impregnated with a thermosetting resin and then heated to harden the thermosetting resin. As a result, the pressure vessel 10 that has excellent corrosion resistance, can achieve weight reduction and cost reduction, and is easy to transport and handle can be produced.

While the pressure vessel 10 according to the embodiment has been described above based on the drawings, the pressure vessel 10 according to the embodiment is not limited to that shown in the drawings, and design changes can be appropriately made thereto within the scope of the gist of the present disclosure. For example, the vessel main body 12 is not limited to that made of a liquid crystal resin.

For example, the vessel main body 12 may be made of another synthetic resin having a gas barrier property, such as high-density polyethylene, or, may be made of light metal, such as an aluminum alloy. Moreover, the vessel main body 12 is not limited to that produced by blow molding, and may instead be produced by injection molding etc.

What is claimed is:

1. A pressure vessel comprising:
a vessel main body having a cylindrical straight body part, a first domed part and a second domed part, the first domed part including a first hemispherical portion, the second domed part including a second hemispherical portion, the first hemispherical portion and the second hemispherical portion having hemispherical shapes and being integrally formed at each end of the straight body part;
a first reinforced section formed by winding reinforcing fibers around an outer circumferential surface of the first domed part such that the reinforcing fibers are interlaced with each other;
a second reinforced section formed by winding the reinforcing fibers helically around an outer circumferential surface of the straight body part, continuously from the first reinforced section; and
a third reinforced section formed by winding the reinforcing fibers around an outer circumferential surface of the second domed part such that the reinforcing fibers are interlaced with each other, continuously from the second reinforced section,
wherein as seen from a direction orthogonal to an axial direction of a longitudinal central axis of the vessel main body, the reinforcing fibers transition between being wound to be interlaced with each other at a winding angle with respect to the longitudinal central axis and being wound helically at the winding angle.

2. The pressure vessel according to claim 1, wherein, as seen from the direction orthogonal to the axial direction of the longitudinal central axis of the vessel main body, the first reinforced section transitions to the second reinforced section on a side of a first axial end of the central axis from a first border between the straight body part and the first domed part, and the second reinforced section transitions to the third reinforced section on a side of a second axial end of the central axis from a second border between the straight body part and the second domed part.

3. The pressure vessel according to claim 2, wherein, as seen from the direction orthogonal to the axial direction of the central axis, the first reinforced section transitions to the second reinforced section on a side of an axial center of the central axis from a first specific portion in an outer circumferential surface of the first hemispherical portion that is determined by the winding angle, relative to the central axis, of the reinforcing fibers wound around the straight body part, and the second reinforced section transitions to the third reinforced section on a side of the axial center of the central axis from a second specific portion in an outer circumferential surface of the second hemispherical portion that is determined by the winding angle, relative to the central axis, of the reinforcing fibers wound around the straight body part.

4. The pressure vessel according to claim 3, wherein:
as seen from the direction orthogonal to the axial direction of the central axis, the first specific portion is an imaginary circumference passing through an imaginary intersection point between the outer circumferential surface of the first hemispherical portion and the reinforcing fibers wound at the winding angle and passing through an intersection point between the first border and the central axis; and
as seen from the direction orthogonal to the axial direction of the central axis, the second specific portion is an imaginary circumference passing through an imaginary intersection point between the outer circumferential surface of the second hemispherical portion and the reinforcing fibers wound at the winding angle and passing through an intersection point between the second border and the central axis.

5. The pressure vessel according to claim 1, wherein:
the first domed part includes a first cylindrical portion protruding toward a first axial end of the longitudinal central axis of the vessel main body;
the second domed part includes a second cylindrical portion protruding toward a second axial end of the central axis; and
as seen from the direction orthogonal to the axial direction of the central axis, an angle, relative to the central axis, of an imaginary tangential line passing through a terminal end, on a side of the first hemispherical portion, of a first curved surface continuing from the first cylindrical portion to the first hemispherical portion is equal to or smaller than the winding angle, relative to the central axis, of the reinforcing fibers wound around the straight body part, and an angle, relative to the central axis, of an imaginary tangential line passing through a terminal end, on a side of the second hemispherical portion, of a second curved surface continuing from the second cylindrical portion to the second hemispherical portion is equal to or smaller than the winding angle.

6. The pressure vessel according to claim 1, wherein, as seen from the direction orthogonal to the axial direction of the longitudinal central axis of the vessel main body, the winding angle, relative to the central axis, of the reinforcing fibers wound around the straight body part is within a range of 54.7 degrees±10 degrees.

7. A pressure vessel manufacturing method in which a vessel main body having a cylindrical straight body part, a first domed part and a second domed part, the first domed part including a first hemispherical portion, the second domed part including a second hemispherical portion, the first hemispherical portion and the second hemispherical portion having hemispherical shapes and being integrally formed at each end of the straight body part, is wound with reinforcing fibers to reinforce the vessel main body, the method comprising:
a first step of winding the reinforcing fibers around an outer circumferential surface of the first domed part such that the reinforcing fibers are interlaced with each other;
a second step of helically winding the reinforcing fibers around an outer circumferential surface of the straight body part, continuously from the first step; and
a third step of winding the reinforcing fibers around an outer circumferential surface of the second domed part such that the reinforcing fibers are interlaced with each other, continuously from the second step,
wherein as seen from a direction orthogonal to an axial direction of a longitudinal central axis of the vessel main body, the reinforcing fibers transition between being wound to be interlaced with each other at a winding angle with respect to the longitudinal central axis and being wound helically at the winding angle.

8. The pressure vessel manufacturing method according to claim 7, wherein, as seen from the direction orthogonal to the axial direction of the longitudinal central axis of the vessel main body, the first step transitions to the second step on a side of a first axial end of the central axis from a first border between the straight body part and the first domed part, and the second step transitions to the third step on a side of a second axial end of the central axis from a second border between the straight body part and the second domed part.

9. The pressure vessel manufacturing method according to claim 8, wherein, as seen from the direction orthogonal to the axial direction of the central axis, the first step transitions to the second step on a side of an axial center of the central axis from a first specific portion in an outer circumferential surface of the first hemispherical portion that is determined by the winding angle, relative to the central axis, of the reinforcing fibers wound around the straight body part, and the second step transitions to the third step on a side of the axial center of the central axis from a second specific portion in an outer circumferential surface of the second hemispherical portion that is determined by the winding angle, relative to the central axis, of the reinforcing fibers wound around the straight body part.

10. The pressure vessel manufacturing method according to claim 9, wherein:
as seen from the direction orthogonal to the axial direction of the central axis, the first specific portion is an imaginary circumference passing through an imaginary intersection point between the outer circumferential surface of the first hemispherical portion and the reinforcing fibers wound at the winding angle and passing through an intersection point between the first border and the central axis; and
as seen from the direction orthogonal to the axial direction of the central axis, the second specific portion is an imaginary circumference passing through an imaginary intersection point between the outer circumferential surface of the second hemispherical portion and the reinforcing fibers wound at the winding angle and passing through an intersection point between the second border and the central axis.

11. The pressure vessel manufacturing method according to claim 7, wherein, as seen from the direction orthogonal to the axial direction of the longitudinal central axis of the vessel main body, the winding angle, relative to the central axis, of the reinforcing fibers wound around the straight body part is within a range of 54.7 degrees±10 degrees.

* * * * *